(No Model.)

J. T. MASSEY.
BRIDLE ATTACHMENT.

No. 278,988. Patented June 5, 1883.

WITNESSES:
Otto Berger
C. Sedgwick

INVENTOR:
J. T. Massey
BY Munn & Co
ATTORNEYS.

UNITED STATES PATENT OFFICE.

JOHN T. MASSEY, OF ROUND MOUNTAIN, TEXAS, ASSIGNOR TO HIMSELF AND ROBERT PRICE, OF SAME PLACE.

BRIDLE ATTACHMENT.

SPECIFICATION forming part of Letters Patent No. 278,988, dated June 5, 1883.

Application filed January 19, 1883. (No model.)

*To all whom it may concern:*

Be it known that I, JOHN T. MASSEY, of Round Mountain, in the county of Blanco and State of Texas, have invented a new and Improved Bridle Attachment, of which the following is a full, clear, and exact description.

My invention relates to an attachment to bridles, to be used therewith with bits or not, as desired; and it consists of a contrivance of nose-clamping strap having end rings through which pass the ends of a chin-strap connected by rein-straps passing through rings of a head-strap of the attachment, which is connected suitably with the crown-strap of the bridle, the invention comprising also a connection of the martingale-straps with the rings of the nose-clamping straps, whereby the attachment may be used for both driving and riding, to powerfully check up the horse when required, and also to prevent rearing and plunging of the animal by pressure on his nostrils to cut off his breath, all as hereinafter fully described.

Reference is to be had to the accompanying drawings, forming part of this specification, in which similar letters of reference indicate corresponding parts in both the figures.

Figure 1:
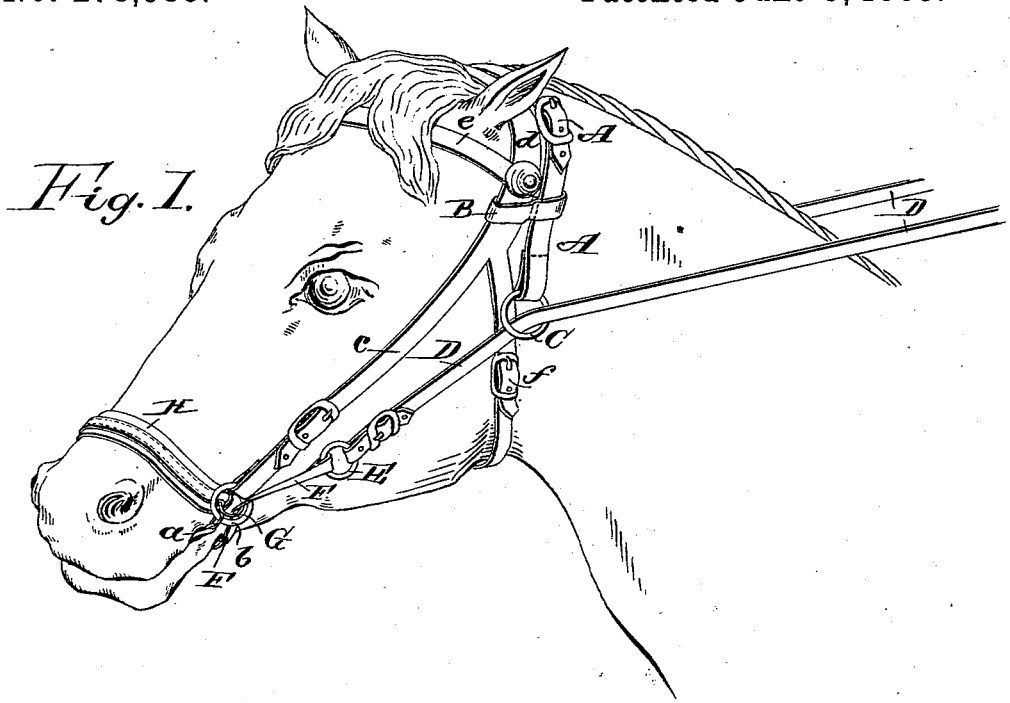
Figure 2:
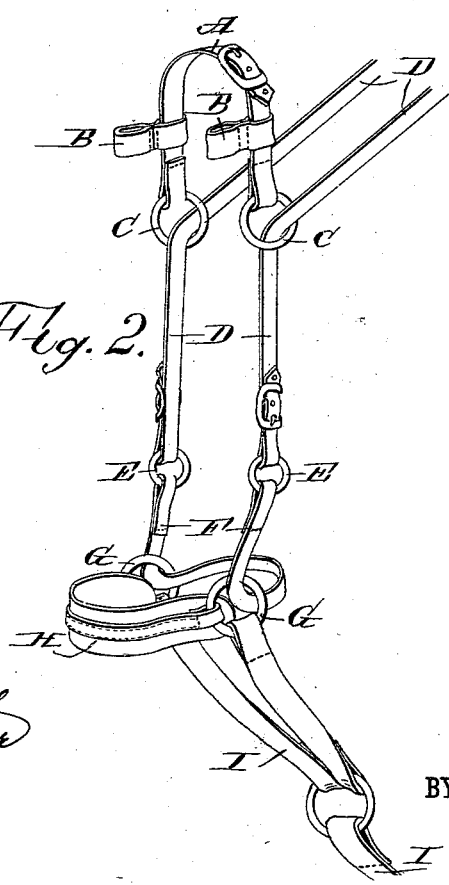

Figure 1 shows my improved attachment on the horse and applied to use with a bit-bridle, the martingale-straps being disconnected; and Fig. 2 is a perspective view of the attachment disconnected from the bridle and with the martingale-straps attached.

To an ordinary bridle consisting of bit *a*, bit-rings *b*, cheek-straps *c*, crown-strap *d*, forehead-strap *e*, and throat-latch *f*, I connect my improved attachment, of Fig. 2, at the top, by its head-strap, A, by loops B, connecting with the crown-strap *d* of the bridle, above or below the forehead-strap *e* thereof; the strap A having pendent loops with rings C for the passage of the check or driving reins D, which range down the cheeks of the animal and connect at both sides by rings E, with the looped chin-strap F, which is passed from beneath at both ends through the end rings, G, of the nose-strap H; the straps F H having such relation to each other that they encircle together the under lip or chin of the horse and his nose just above the nostrils, as in Fig. 1, so that by drawing upon the reins D the strap H shall be pressed down, and in proportion to the power of the pull on the reins to close the nostrils of the animal and stop or partially cut off his breath to subdue and control him when unruly, or to check his speed for safer or more pleasurable riding or driving; and the clamping action of the nose-strap H on the nostrils, while being more quick and effective than a bit, does not stretch, cut, or injure the animal's mouth, as a bit would; and, furthermore, the straps F H, being outside the horse's mouth, cannot be seized by the animal's teeth, as bits often are, causing a loss of all control over the horse, at least for a time.

My improved attachment is equally as effective in preventing jumping, rearing, or plunging of the animal by connecting the martingale-straps I, which pass from the girth, between his fore legs, to the rings G of the nose-strap, so that any unusual upward pull upon the martingale will act through head-strap A and check or driving reins D to clamp the nostrils and cut off the breath of the animal, as above described; and the attachment may be used as a check to have suitable connections to the pommel of a riding-saddle, or the check-hook or water-hook of an ordinary working-saddle, with effective results in holding the animal's head up as desired.

Fig. 1 illustrates my improvement in use with a bit-bridle, in which case I pass the strap F through the bit-rings *b*, the connections being adjusted as to size to allow a slight pull of the reins D to guide the horse by the bit in the usual manner without unduly pressing his nostrils, and permitting the animal, when quiet and well disposed, to be driven without discomfort to him, yet holding him under instant subjection at all times; should he become restive or unruly; and my improved attachment may be as well used with a bitless bridle, in which case the nose and chin straps H F will be connected with the cheek-straps of the bridle to constitute its lower or nose band, as will readily be understood.

Thus constructed and applied it is believed that my improvement will be found more comfortable to the animal than other devices heretofore used for like purposes, and, being self-adjustable by the tightening of the nose-band under pressure, and its yielding under slack of rein, will afford better control of the animal without great exertion on the part of his rider or driver; and the attachment may be easily made in both cheap and expensive style to suit the character of the harness with which it is to be used.

Having thus described my invention, I claim as new and desire to secure by Letters Patent—

1. The attachment for bridles, consisting of the head-strap having at its ends rings, the nose-strap having at its ends rings, the chin-strap looped through the rings of the nose-strap, and the reins connected to the ends of the chin-strap and passed through the rings of the crown-strap, substantially as and for the purpose set forth.

2. The combination, with the bridle having the crown-strap d, forehead-strap e, and cheek-strap c, of the head-strap A, having the rings C and loop-connections B, nose-strap H, having rings G, connected to the bit-rings, chin-strap F, looped through the rings G, and having rings E, and reins D, passed through the rings C and connected to the rings E, substantially as and for the purpose specified.

3. The combination of the head-strap A, having rings C, nose-strap H, having rings G, chin-strap F, looped through the rings G, reins D, passed through the rings C and connected to the chin-strap F, and the martingale I, connected to the rings G, substantially as and for the purpose set forth.

JOHN T. MASSEY.

Witnesses:
JOHN B. FONDA,
RACHEL BLUMENTHAL.